(12) United States Patent
Kigami et al.

(10) Patent No.: US 6,603,621 B1
(45) Date of Patent: Aug. 5, 2003

(54) SYSTEM AND METHOD FOR STORING DISK SECTOR INFORMATION

(75) Inventors: Yuhji Kigami, Yamato (JP); Takashi Kuroda, Yamato (JP); Masayuki Murakami, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 09/662,038

(22) Filed: Sep. 14, 2000

(30) Foreign Application Priority Data

Sep. 27, 1999 (JP) .......................................... 11-273326

(51) Int. Cl.[7] ............................................. G11B 15/12
(52) U.S. Cl. ...................................... 360/61; 369/47.32
(58) Field of Search ........................ 360/48, 53, 77.08, 360/78.04, 78.14, 61; 369/47.22, 47.32; 711/112, 154, 169, 202; 712/218

(56) References Cited

U.S. PATENT DOCUMENTS

| | | | | |
|---|---|---|---|---|
| 4,866,601 A | * | 9/1989 | DuLac et al. ............... | 711/111 |
| 5,748,401 A | * | 5/1998 | Kawai ....................... | 360/78.14 |
| 5,768,617 A | * | 6/1998 | Liu ............................... | 360/53 |
| 5,802,584 A | * | 9/1998 | Kool et al. ................... | 711/154 |
| 5,822,142 A | * | 10/1998 | Hicken ......................... | 360/53 |
| 5,890,209 A | * | 3/1999 | Dobbek ....................... | 711/112 |
| 6,058,084 A | * | 5/2000 | Yamamoto et al. ........... | 360/51 |
| 6,111,714 A | * | 8/2000 | Ueda et al. ................... | 360/60 |
| 6,408,372 B1 | * | 6/2002 | Miyauchi .................... | 711/202 |

\* cited by examiner

*Primary Examiner*—Richemond Dorvil
*Assistant Examiner*—Jason Olson
(74) *Attorney, Agent, or Firm*—Abdy Raissinia; Bracewell & Patterson, L.L.P.

(57) ABSTRACT

A system and method within a hard disk drive for transferring track sector information of a storage disk to a memory device. The system of the present invention includes a disk having multiple tracks, wherein each of the tracks includes at least one sector. The system further includes a memory device for storing sector identification data and user data. A drive data bus is utilized for transferring data between the storage disk and the memory. A controller is utilized to manages read and write operations to and from the storage disk, wherein the controller includes means for selecting either said user data or said sector identification data to be transferred to said memory device.

12 Claims, 10 Drawing Sheets

Data Flow in Drive Data Bus When User Data is Read from Disk

SYSTEM AND METHOD FOR STORING DISK SECTOR INFORMATION

BACKGROUND OF THE INVENTION

1. Technical Field

The present invention relates in general to a disk storage device, and in particular to a system and method for transferring sector identification information to a memory device.

2. Description of the Related Art

A hard disk drives includes a read/write head that must be accurately positioned on each track of the target disk. To meet this requirement, servo information is typically pre-recorded on the disk surface and read utilizing the head during track seeking so as to determine each position in the radial direction of the disk. There have been many sector servo type disk drive apparatuses that employ a method in which servo information is dispersed between data items on the disk.

In a typical disk format within a sector servo type disk drive, a track is divided into multiple data sectors and servo sectors. In this format a servo sector includes information for determining a position of the head in a track as described above. User data is stored in each data sector. An identification (ID) area is also provided in each data sector. This ID area stores information for confirming identity as a data sector, flag information denoting a bad sector, and other information.

An ID area is provided in each sector of tracks that are each divided into multiple servo and data sectors. However, such ID areas often occupy more than 10% of a track area in some disk designs, thus reducing disk space used to record data.

To address this problem, IBM Corp. has proposed a technique (Published Unexamined Patent Application No. 5-174498), which is referred to herein as a "No-ID" method for eliminating the ID area from each disk with use of a servo control method. According to this servo control method, a serial number, referred to as an LBA (Logical Block Address), is assigned to the ID area for each track. An ID table containing this LBA information is recorded in a memory device such as a RAM so as to avoid recording of the ID area on the disk. The result is that there is no ID area to be read and tracks can be disposed at narrower pitches. In addition, the capacity of the object hard disk drive can be used for storing data much more than the conventional technique that has to spare a larger space for the ID areas on each disk.

However, as the number of data sectors is increased (increasing the number of data sectors per track for increased data density) in this way, the track information data to be recorded is also increased, resulting in increased data transfer time. In addition, because other tables aside from the ID table are supported by the same hardware, the data transfer time for storing or updating track information into a memory device is further increased.

From the foregoing it can be appreciated that a need exists to improve hard disk drive performance by reducing the amount of time required to update a sector ID table. In particular it would be useful to implement and system and method by which sector ID information may be stored and updated during a track seeking interval so that a drive data bus can serve be utilized as the transport medium for storing and updating sector ID information.

SUMMARY OF THE INVENTION

A system and method within a hard disk drive for transferring track sector information of a storage disk to a memory device are disclosed herein. The system of the present invention includes a disk having multiple tracks, wherein each of the tracks includes at least one sector. The system further includes a memory device for storing sector identification data and user data. A drive data bus is utilized for transferring data between the storage disk and the memory. A controller is utilized to manages read and write operations to and from the storage disk, wherein the controller includes means for selecting either said user data or said sector identification data to be transferred to said memory device.

All objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 10($b$) illustrates relative timing of a data signal on a drive data bus and a data write enable pulse for a hardware-implemented sector identification table update in accordance with a preferred embodiment of the present invention.

DESCRIPTION OF THE PREFERRED EMBODIMENT

The system and method of the present invention are described in a preferred embodiment in the following description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention.

Figure 1:
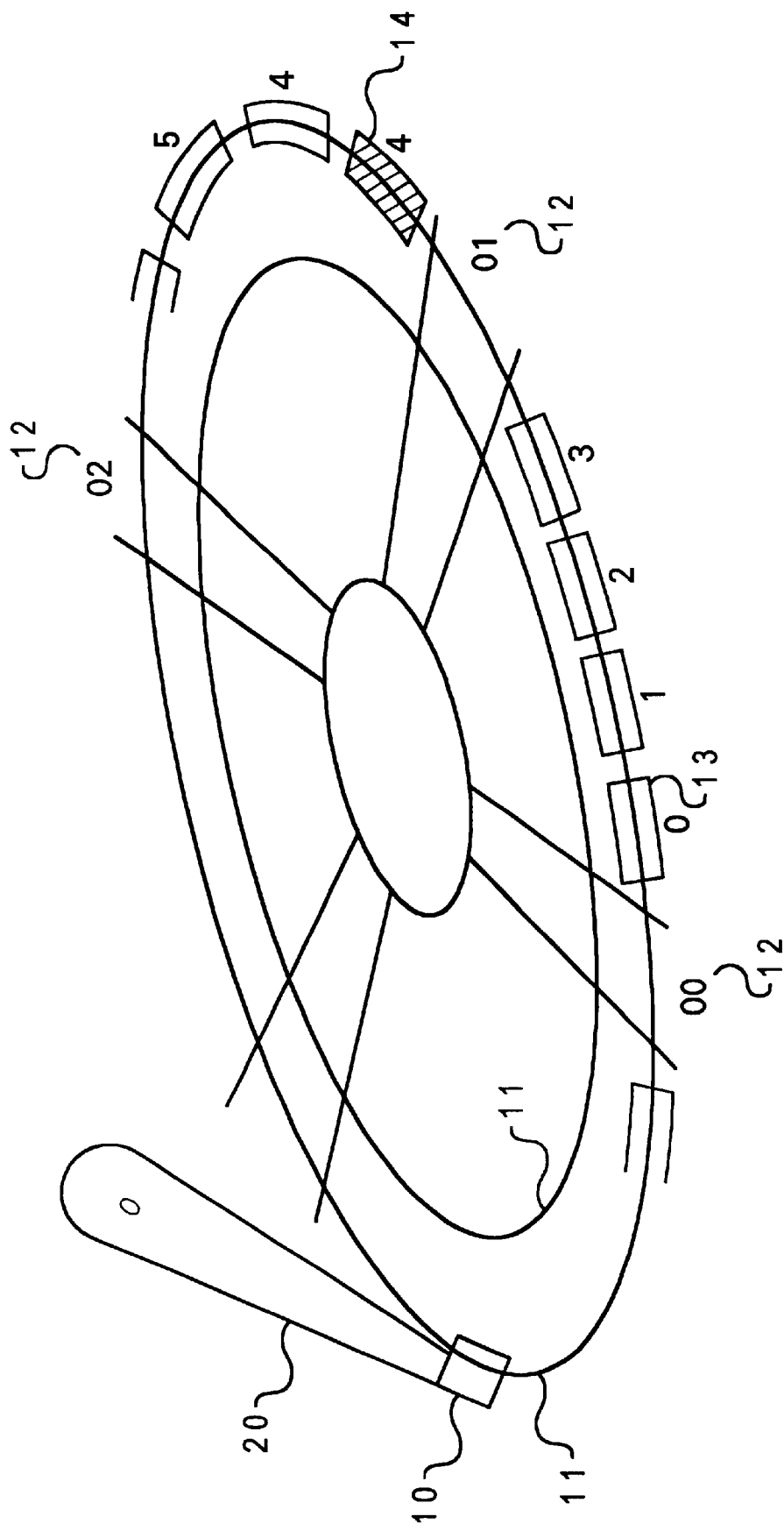
FIG. 1 illustrates a track layout that may be utilized in one embodiment of the present invention.

FIG. 1 illustrates a track layout that may be utilized in one embodiment of the present invention. As shown in FIG. 1, a track 11 on a hard disk is one of the recording areas formed by dividing the surface of the hard disk into annual rings. As further depicted in FIG. 1, track 11 is partitioned into multiple physical servo sectors 12 that form a radial pattern therein. Each physical sector 12 is utilized to determine a radial position of a read/write head 10 on the surface of the disk. Physical sector 12 makes it possible to position the head 10 accurately in a target track. Read/write head 10 includes a read element and a write element that are relatively positioned to accomplish their intended function.

When moving from track 11 to another track, or when loading or unloading, read/write head 10 is moved in the radial direction of the disk by an actuator 20 in attempting to access one of the predetermined number of physical servo sectors 12 that are disposed on the circumference of the disk. As further illustrated in FIG. 1, a sector 13 is formed within an area between physical servo sectors 12. Sector 13 is a recording unit that is delimited to a predetermined size. In the depicted example sector 13 is utilized for storing user data.

As further shown in FIG. 1, a servo pattern consisting of a physical servo sector 12 and a data pattern consisting of a sector 13 have been written on one circumferential space on track 11. Physical servo sector 12 is formed so as to cross sector 13 several times at each round of track 11. Generally, the number of physical servo sectors 12 differs among sectors. For example, one or more of sectors 13 might be bad sectors 14 that are unavailable for reading/writing user data. The hard disk is designed such that even when such a bad sector exists, the hard disk itself continues performing data reading/writing. This is accomplished by first detecting and identifying a bad sector 14 within a sector identification table, and avoiding the use of the sector for recording user data.

Figure 2:
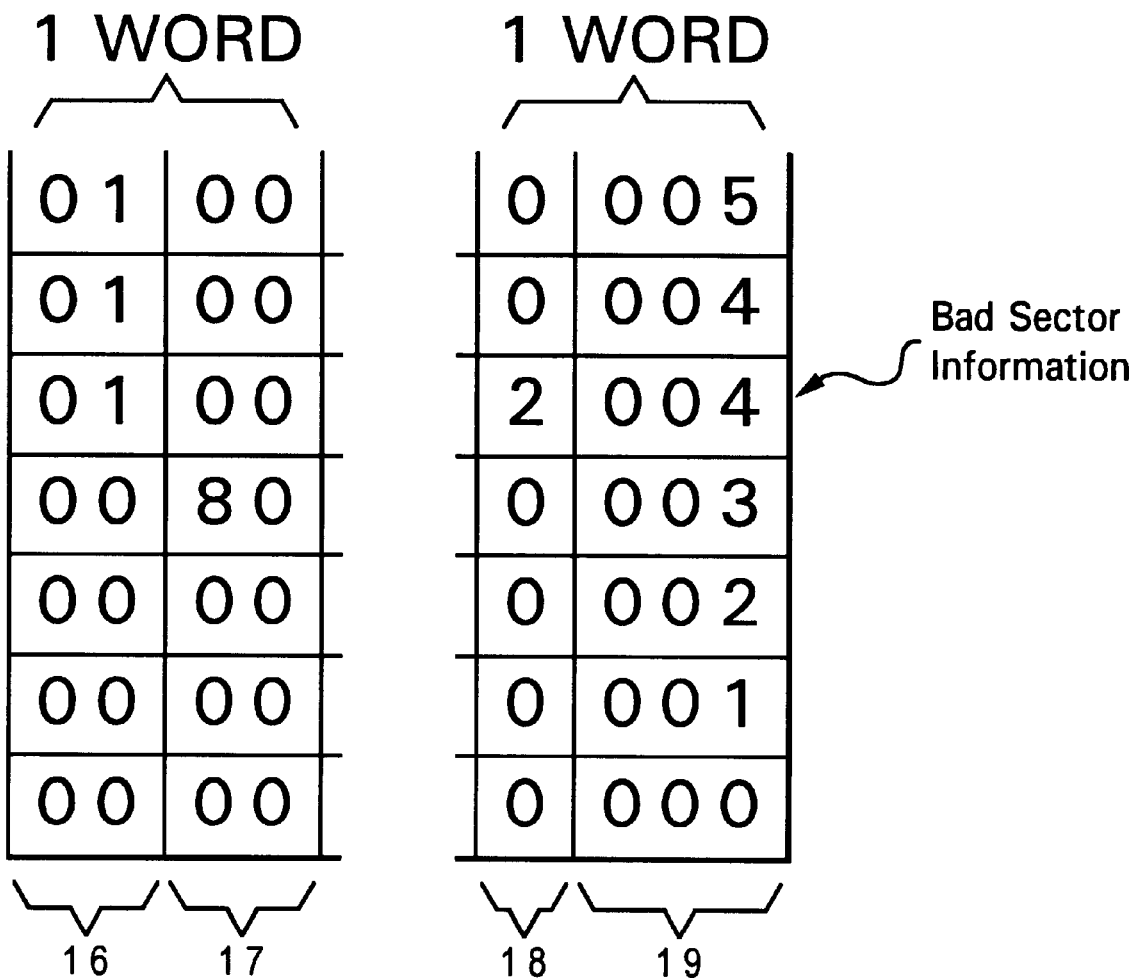
FIG. 2 depicts a format of an ID table that may be utilized in one embodiment of the present invention.

FIG. 2 depicts a format of an ID table that may be utilized in one embodiment of the present invention. The embodiment illustrated in FIG. 2 employs the No-ID method described previously. Physical sector numbers corresponding to data sectors 13 are utilized to identify respective tracks in which data is stored. These physical sector numbers corresponding to data sectors 13 are not provided in the ID area on the disk, but are instead described in a memory device such as a DRAM (to be described later) in an ID table format.

As utilized herein a_track ID_is a serial number that in a preferred embodiment is an LBA (Logical Block Address). Each ID table includes recorded information pertaining to a single one track. The ID table contains data sector information that may include, as shown in FIG. 2, two words. As further illustrated in FIG. 2, a physical sector number 16 and a split identifier 17, are described in the first one word in the ID table. Physical number 16 denotes a number of a physical servo sectors 12, while split identifier 17 includes information denoting how many bytes a sector is divided into. For example, if the split identifier 17 is "00", data is stored in the whole sector, while a split identifier of "80" denotes that data is stored in the entire sector and that the data ends in the sector, in which case the physical sector number 16 will be changed.

Other numbers associated with a physical sector may be utilized to denote that a sector is split into two front and rear parts, and also to denote the length of the front part data in terms of numbers of bytes. For example, a split identifier of "05" denotes that the sector is split at the 25$^{th}$ byte (quintuple of "05"). Similarly, split identifiers of "08" and "09" denote that the sector is split at the 40th byte and the 45th byte, respectively.

In the next word shown in FIG. 2, a 4-bit flag information 18 is utilized for identifying a bad sector. A 10-bit LBA information 19 for a single track (1024 sectors) is also provided. In addition, the ID table may include such information as the end of a track, the end of the table, etc. As shown in this example, track information including a list of bad sectors is described in the ID table. When data transfer to or from one track is ended, the ID table for the next track is transferred.

Figure 3:
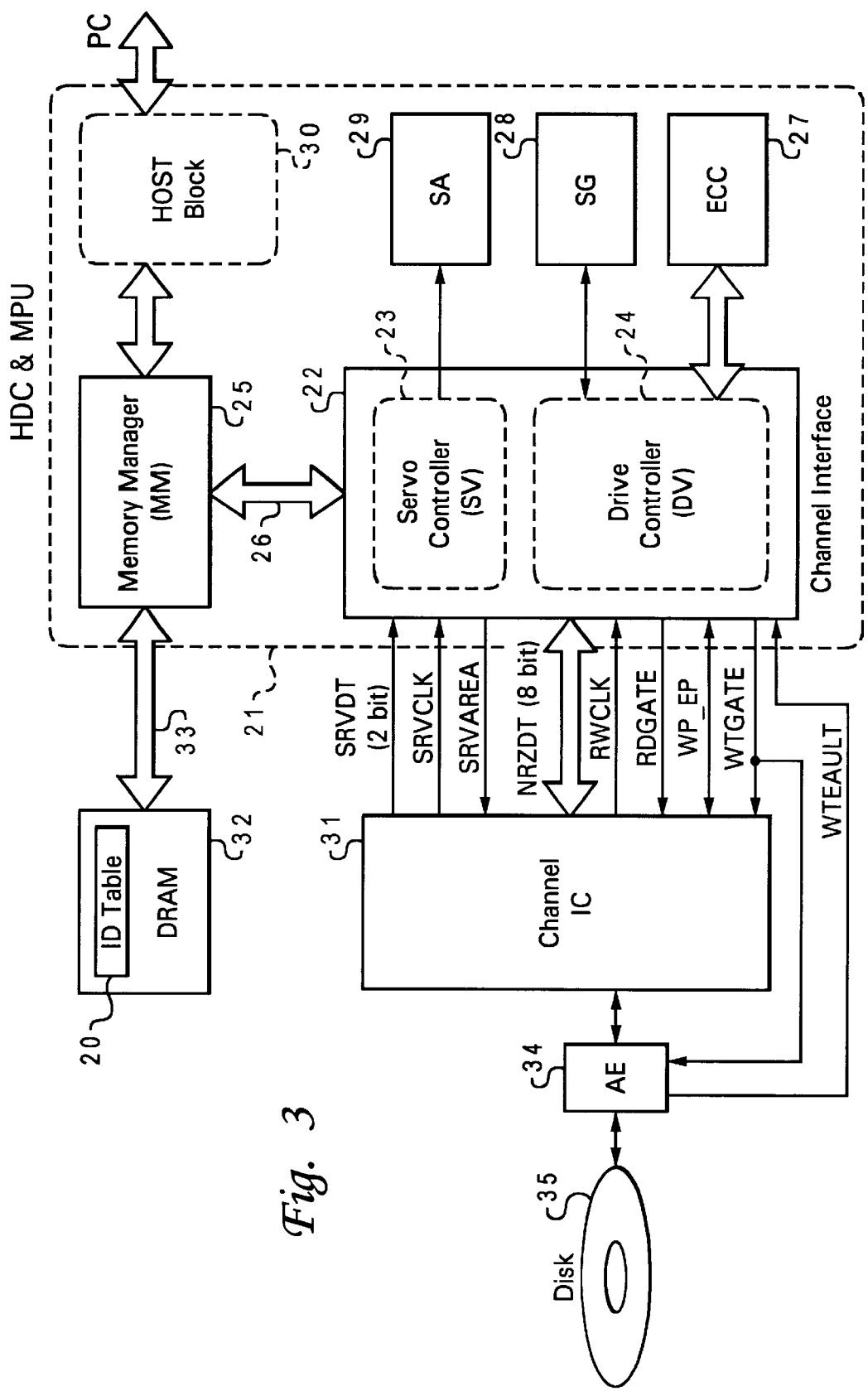
FIG. 3 is a block diagram of a hard disk drive that may be utilized in one embodiment of the present invention.

FIG. 3 is a block diagram illustrating a hard disk drive that may be utilized in one embodiment of the present invention. The configuration shown in this block diagram may be implemented in circuit boards, or the like, mounted in the hard disk drive apparatus and realized by combining LSIs (Large Scale Integrated circuits) and memory devices. As depicted in FIG. 3, the hard disk drive includes a Hard Disk Controller and Microprocessing Unit (HDC & MPU) 21. Within HDC & MPU 21 is a channel interface 22 that controls interface signals exchanged between HDC & MPU 21 and a channel integrated circuit (IC) 31. In the depicted embodiment, channel interface 22 is provided with a servo controller (SV) 23 and a drive controller (DV) 24. The SV 23 controls servo data and the DV 24 controls user read data and user write data.

During a user data write operation, DV 24 receives user data through a 32-bit drive data bus 26 from a memory manager (MM) 25, and transmits the user data to both channel IC 31 and an error checking and correction (ECC) block 27. ECC block 27 generates ECC information related to user data at the end of each user data block, and DV 24 transmits the received ECC information to channel IC 31.

For a user data read operation, ECC block 27 checks by calculation for a user data error after obtaining data from channel IC 31. If an error is detected, ECC block 27 and DV 24 correct the error and write the corrected data into memory means DRAM 32 through MM 25 and common path 33. User data as well as an ID table 20, are written to and stored in DRAM 32.

As further illustrated in FIG. 3, HDC & MPU 21 includes a segment handler 28 for controlling a cache, a servo assist 29 for calculating a servo feedback value, etc., and a host block 30 for controlling data exchanges with a PC. HDC & MPU 21 further includes an amplifier (AE) 34 between channel IC 31 and a storage disk 35.

Various signals are exchanged between channel interface 22 and channel IC 31 including, for example, servo data SRVDT, a servo synchronization clock SRVCLK, a servo area signal SRVAREA which is activated in response to servo data read from a sector distinguished from a physical servo sector 12 or a sector 13. Other signal exchanged between channel interface 22 and channel IC 31 include a bus signal NRZDT for enabling exchanges of digital 8-bit data, a clock PWCLK synchronized with user data, a signal RDGATE activated in response to data reading, a write parity signal WP_EP, and a signal WTGATE activated in response to data writing. A signal WTEAULT is entered to channel interface 22 for enabling AE 34 to report a power supply error.

Figure 4:
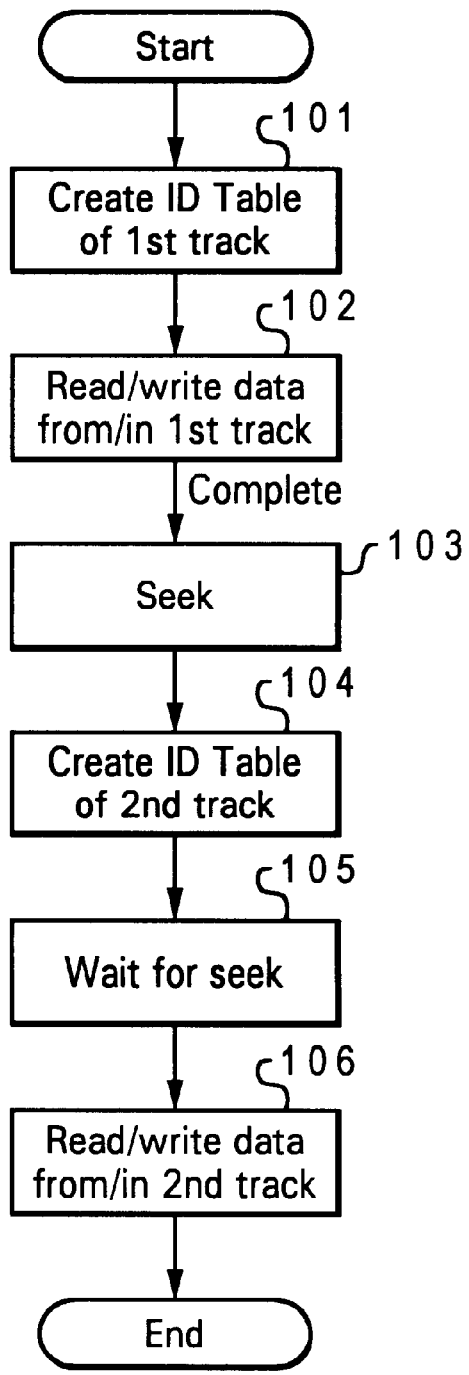
FIG. 4 is a flow diagram illustrating steps performed during creation of a sector identification table in accordance with a preferred embodiment of the present invention.

With reference now to FIG. 4 there is depicted a flow diagram illustrating steps performed during creation of a sector identification table in accordance with a preferred embodiment of the present invention. The steps described with reference to FIG. 4 provide a relative timing context of ID table creation in a first track with respect to ID table creation in a second track. ID tables for other tracks on the same storage disk are also created similarly.

As illustrated at step 101, an ID table in a first track on disk 35 is created in DRAM 32. Next, as shown at step 102, user data is read from or written to the first track. During the read/write operation, HDC & MPU 21 transfers data to or from disk 35 through drive data bus 26. After the read/write operation performed in the first track, a track seek operation having a given seek time is initiated to move the head to the next track (step 103). In an important feature of the present invention, the drive data bus 26 is utilized during this seek time period to create an ID table for the second track within DRAM 32 as illustrated at step 104.

As shown at step 105, if the ID table creation is completed before the end of the seek time, the disk drive system pauses any further operations until the end of the seek time. Upon completion of the seek operation, user data read/write operation on the second track may commence in accordance with sector identification information within the created ID table for the second track (step 106). Drive data bus 26 is not needed for user data transfer between the start of the seek time (step 103) and waiting for the end of the seek time (step 105), and is therefore available to perform data transfer for ID table creation and update.

Figure 5:
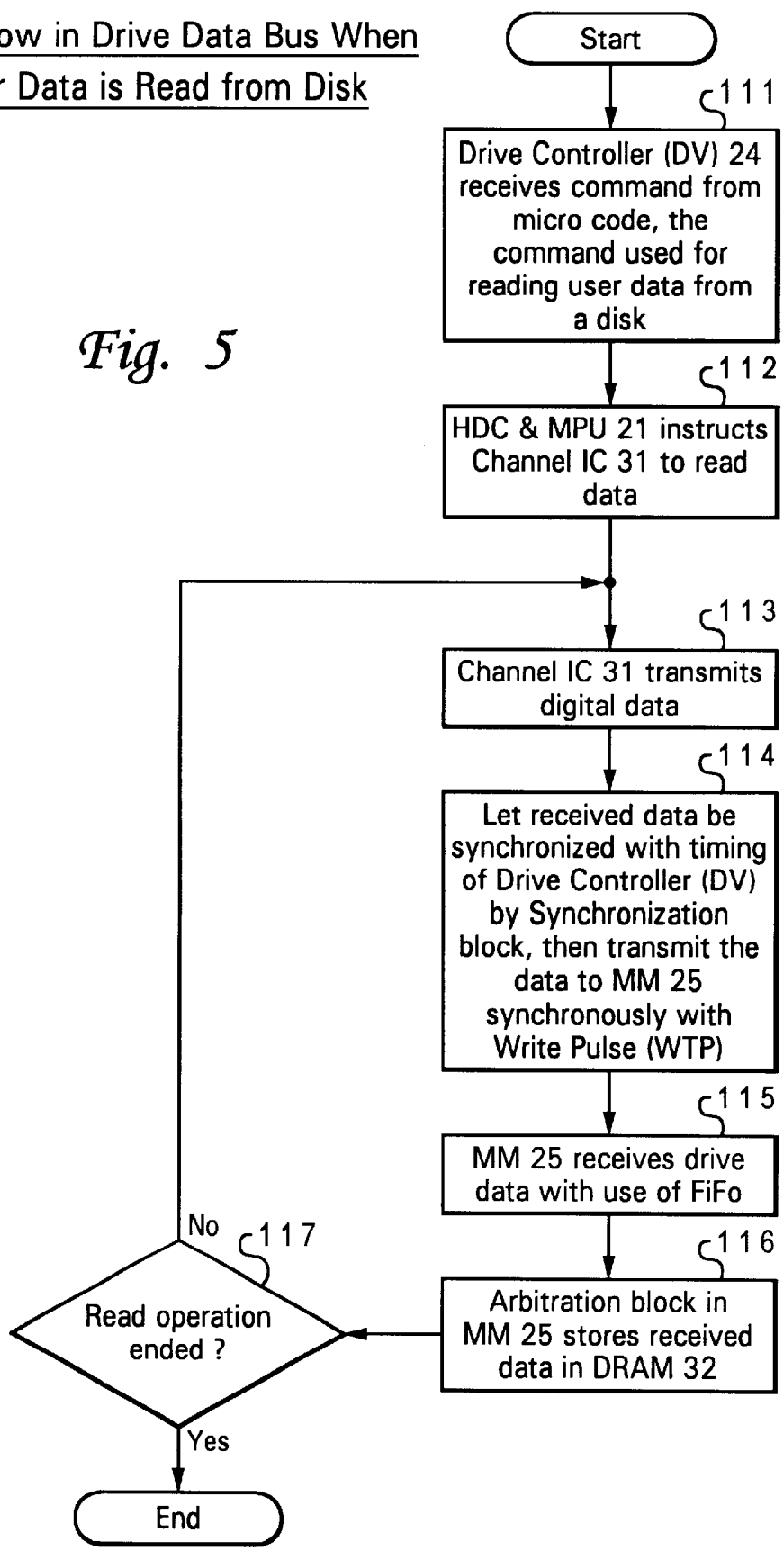
FIG. 5 is a flow diagram depicting a user data flow in a drive data bus during a data read operation.

Turning now to FIG. 5 there is illustrated a flow diagram depicting a user data flow in drive data bus 26 during a user data read operation. Initially, as shown at step 111, drive controller (DV) 24 receives a micro code command, which may be a MPU program. The received micro code command instructs DV 24 to read user data from disk 35. Then, as depicted at step 112, HDC & MPU 21 instructs channel IC 31 to read the data from disk 35. In response to the read instruction, channel IC 31 transmits digital data to the synchronization block as illustrated at step 113. The synchronization block (to be described later) synchronizes the received data with the timing of the drive controller (DV), and then transmits the matched data to memory manager (MM) 25 synchronously with a write pulse signal (WTP) (step 114). MM 25 receives drive data in a FIFO manner (to be described later) as shown at step 115. The received data is stored within DRAM 32 by an arbitration block (to be described later) provided within MM 25 (step 116). Operations in and after step 113 are repeated (step 117) until the read operation is finished. When the read operation is finished, the system exits from the series of processings.

Figure 6:
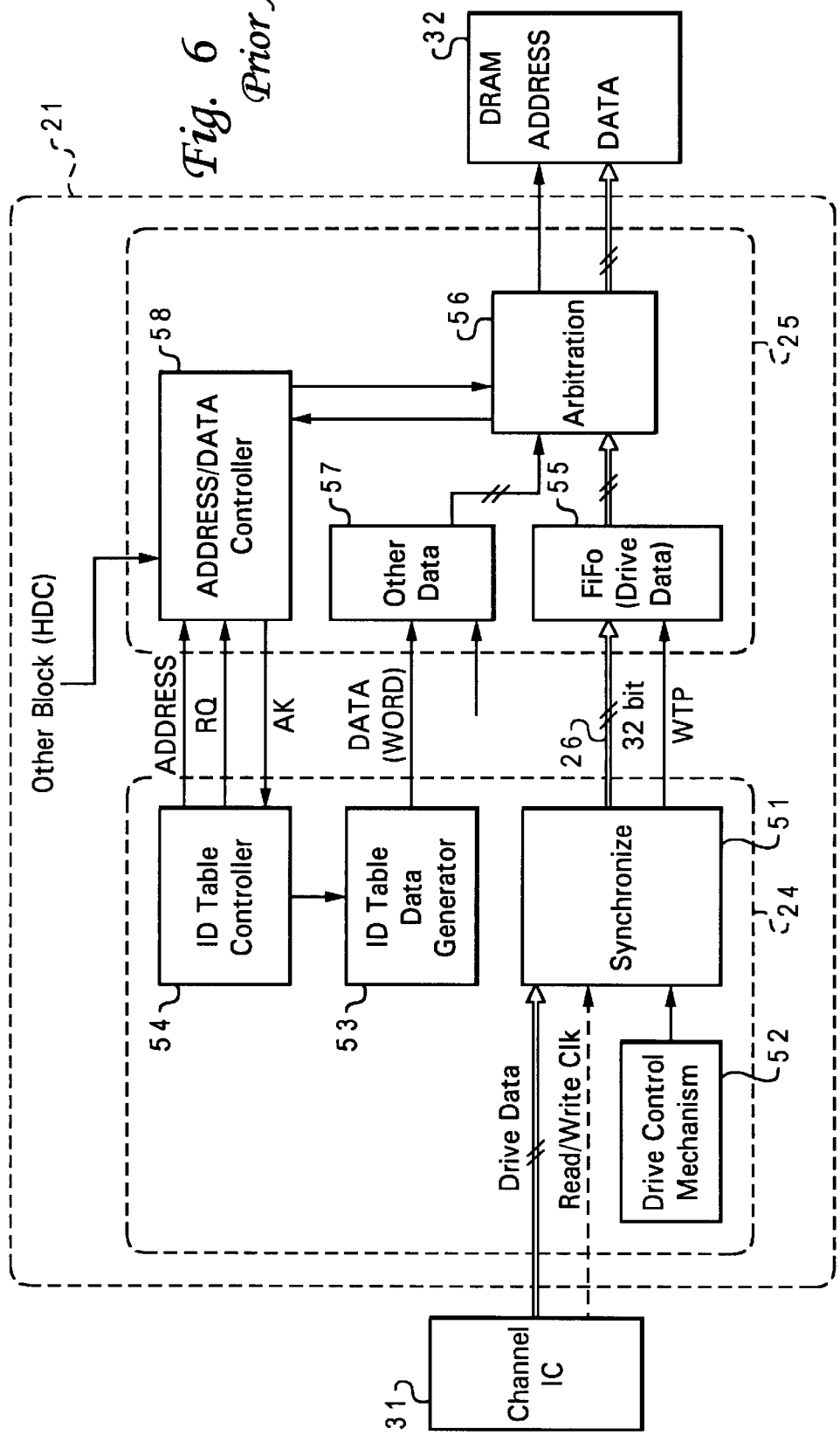
FIG. 6 is a block diagram illustrating a conventional system for utilizing a hand-shaking technique to transfer sector identification information to a memory device.
Figure 7:
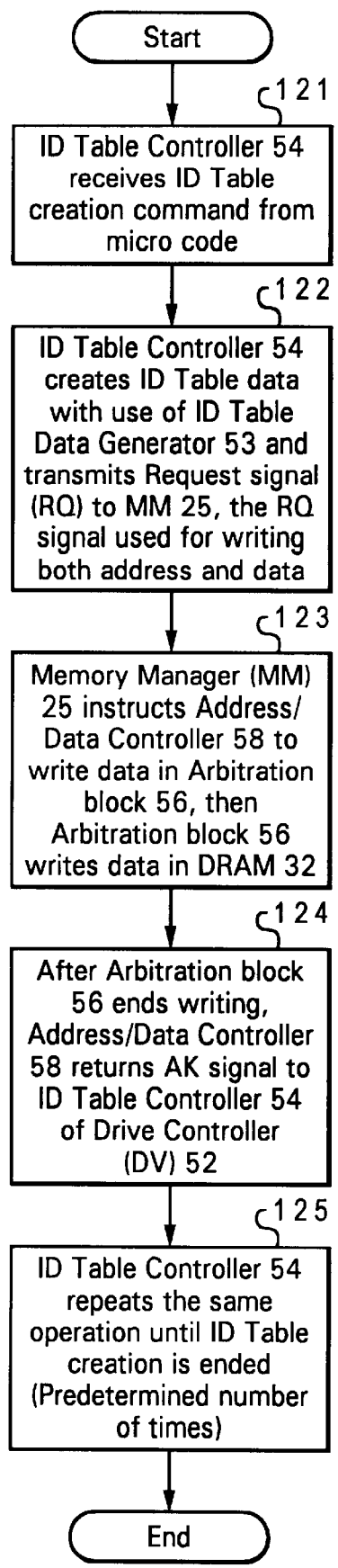
FIG. 7 is a flow diagram depicting steps performed by the system in FIG. 6 for transferring sector identification data to a memory device.

FIGS. 6 and 7 depict a conventional handshaking technique for creating an ID table. The description in FIGS. 6 and 7 provides a convenient reference to the description of FIGS. 8 and 9 which illustrate creation of an ID table in accordance with a preferred embodiment of the present invention.

With reference first to FIG. 6, there is depicted a block diagram illustrating a conventional system for utilizing a hand-shaking technique to transfer sector identification information to a memory device. As shown in FIG. 6, the system includes HDC & MPU21 that includes drive controller (DV) 24. Within DV 24 is a synchronization block 51 that synchronizes a disk synchronization read/write clock signal with the system clock of the LSI.

Synchronization block 51 receives the read/write clock signal from channel IC 31. An 8-bit drive data output from channel IC 31 is also received by synchronization block 51 which transports the data through a 32-bit drive data bus 26 to a FIFO buffer 55 within MM 25. Synchronization block 51 then outputs a write pulse signal (WTP) to FIFO 55. A drive control mechanism 52 controls the actual reading or writing of data from or to the disk.

Drive controller 24 further includes an ID table data generator 53 that generates an ID table according to an instruction from an ID table controller 54 which is also within drive controller 24. When controlling creation of an ID table, ID table controller 54 generates the ID table by hand-shaking with MM 25. The handshaking protocol depicted in FIG. 6 consists exchanging a request signal (RQ) and an acknowledge signal (AK) with MM 25 utilizing machine readable instructions in the form of software or firmware.

FiFo (First in First out) 55, is an internal buffer designed to receive data from a disk at a fixed data rate. An arbitration block 56 writes received data into DRAM 32 sequentially. An address/data controller 58 controls generation of ID tables and writing of data into DRAM 32. Another data block 57 is utilized for other data control functions.

Turning now to FIG. 7 there is illustrated a flow diagram depicting steps performed by the system in FIG. 6 for transferring sector identification data to a memory device utilizing hand-shaking. Starting at step 121, ID table controller 54 receives an ID table creation command from the micro code of the MPU. In response to receiving the ID table creation command, ID table controller 54 instructs ID table generator 53 to create ID table data, and also transmits a request signal (RQ) to MM 25 as depicted at step 122.

The request signal (RQ) requests to write an address and data. At this time, only one word is transmitted from ID table generator 53 at a time in accordance with the hand-shaking protocol. In response to receiving RQ, MM 25 instructs arbitration block 56 to write data via address/data controller 58 into DRAM 32 as illustrated at step 123. After the data write by arbitration block 56, address/data controller 58 returns an acknowledge signal (AK) to ID table controller 54 as illustrated at step 124. ID table controller 54 repeats the above operations until the object ID table creation is completed as shown at step 125.

According to such an ID table creating procedure, an ID table is created in a software-like manner through hand-shaking exchanges of the request signal (RQ) and the acknowledge signal (AK), thus requiring an extended table creation time. In addition, the circuit required to implement the method and system depicted in FIGS. 6 and 7 is expanded in scale, thereby increasing the manufacturing cost. The time required for transferring ID table data into the DRAM 32 thus often exceeds the seek time.

Figure 8:
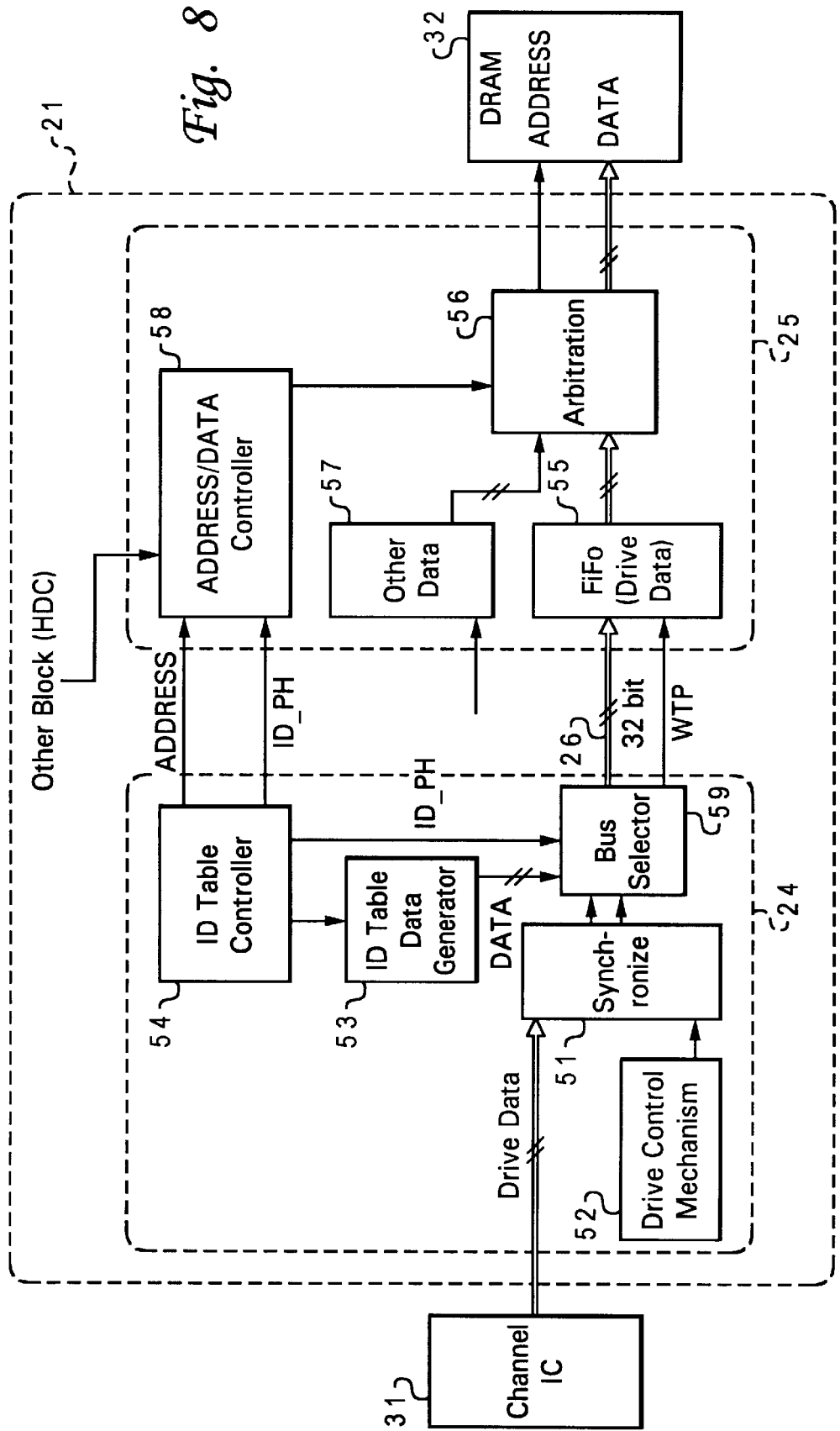
FIG. 8 is a block diagram illustrating a system for creating and updating a sector identification table in accordance with a preferred embodiment of the present invention.

FIG. 8 is a block diagram illustrating a system for creating and updating a sector identification table in accordance with a preferred embodiment of the present invention. The system depicted in FIG. 8 provides for ID table creation logic that advantageously utilizes drive data bus 26. Description for the identical items as those in FIG. 6 will be omitted here to avoid redundancy.

The block diagram shown in FIG. 8 illustrates a system that is significantly from that shown in FIG. 6 due in part to the addition of a bus selector 59. Bus selector in included in the configuration for providing a means to switch data selection between drive data and ID table data through drive data bus 26. In the depicted embodiment, ID table controller 54 does not hand-shake with the memory manager (MM) 25 to effectuate ID table creation. Instead, controller 54 delivers a signal ID#PH to MM 25. Signal ID#PH denotes that drive data bus 26 is to be utilized for transferring ID table data. In addition, ID table generator 53 is no longer designed to transfer ID table data to the MM 25, but instead is designed to transfer the data to bus selector 59 in response to signal ID#PH received from ID table controller 54. In response to receiving data transferred in this manner, bus selector 59 transfers ID table data to FiFo 55 via drive data bus 26.

Figure 9:
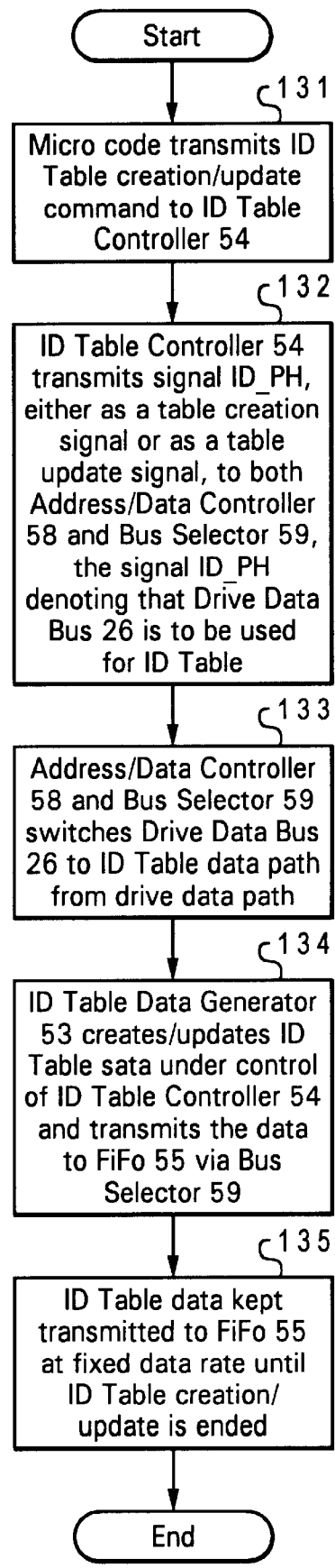
FIG. 9 is a flow diagram depicting steps performed with the system in FIG. 8 for creating and updating a sector identification table in accordance with a preferred embodiment of the present invention.

FIG. 9 is a flow diagram depicting steps performed with the system in FIG. 8 for creating and updating a sector identification table in accordance with a preferred embodiment of the present invention. Starting at step 131, the micro code sends an ID table creation or update command to ID table controller 54. This ID table creation/update command instructs ID table controller 54 to transfer an ID table during a seek time after a user data read or write operation has ended as described with reference to FIG. 4. The ID table creation/update command is thus output from the micro code in accordance with this timing requirement.

Receiving the ID table creation/update command, ID table controller 54 transmits a signal ID_PH to address/data controller 58 and bus selector 59 as shown at step 132. It is understood that signal ID_PH is a table creation command signal when used to create a new ID Table, and ID_PH is a table update signal when used to update the existing previously created ID Table. Signal ID_PH denotes that drive data bus 26 is to be utilized for transferring ID table data rather than user data. As illustrated at step 133, upon receiving signal ID_PH, address/data controller 58 and bus selector 59 switch drive data bus 26 to a ID table data path from a drive data path. Under the direction of ID table controller 54, ID table data generator 53 generates ID table data and transmits the data to FiFo 55 via bus selector 59 as depicted at step 134. The ID table data is transmitted to FiFo 55 at a fixed data rate until the creation of the ID table is completed (step 135). In this manner, drive data bus 26 can be utilized to transfer ID table data to DRAM 32.

Figure 10A:
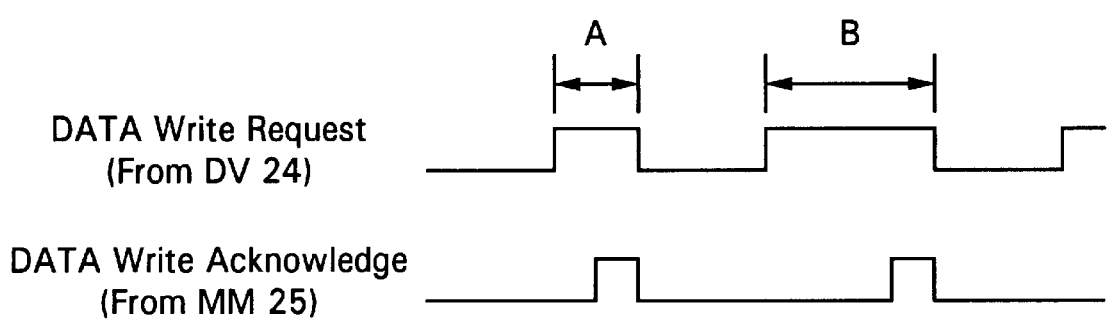
FIG. 10($a$) depicts relative timing of a data write request and a data write acknowledge for a conventional software-implemented hand-shaking sector identification table update method.

With reference now to FIG. 10(a), there is depicted a relative timing of a data write request and a data write acknowledge for a conventional soft-ware implemented hand-shaking sector identification table update method. The lower row in FIG. 10(a) shows an AK signal for data writing output from MM 25, while the upper row shows a data write request (RQ) signal output from DV 24. As illustrated in FIG. 10(a), the duration of data write requests may vary according to the state of the memory in use, thus data transfer utilizing a handshaking technique is not performed at fixed, predictable intervals.

Figure 10B:
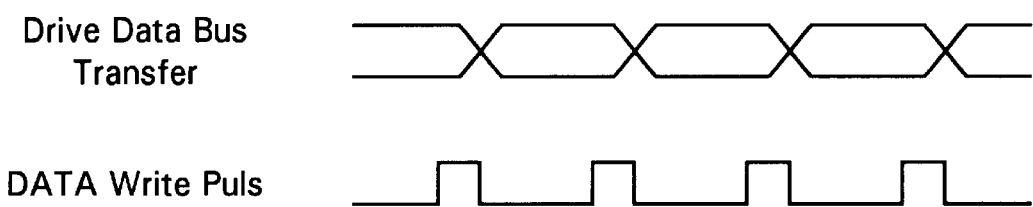

FIG. 10(b) illustrates relative timing of a data signal on a drive data bus and a data write enable pulse for a hardware-implemented sector identification table update in accordance with a preferred embodiment of the present invention. A data write pulse is illustrated in the lower row of FIG. 10(b), and the transfer of data through drive data bus 26 is illustrated in the upper row. As illustrated in FIG. 10(b), data on drive data bus 26 can be transferred at fixed intervals unlike the data transfer through hand-shaking.

It is thus possible to transfer ID table data to DRAM 32 at a fixed writing rate with utilizing a specialized drive data bus. Such fixed timing writing of ID table information during seek times is not feasible utilizing general hand-shaking. In addition, if another circuit utilizes the memory device, the next data transfer is disabled until the circuit completes the use of the memory. However, since ID table data transfer is done with use of the drive data bus (hardware), the present invention requires no need to wait for a completion of the access from another circuit to the memory, thereby assuring fast data transfer to the memory. It is thus possible to complete the transfer of ID table data easily within a seek time in which no user data is transferred. The hard disk performance is this significantly improved.

While the invention has been particularly shown and described with reference to a preferred embodiment, it will be understood by those skilled in the art that various changes in form and detail may be made therein without departing from the spirit and scope of the invention.

What is claimed is:

1. A system within a hard disk drive for transferring track sector information of a
    storage disk to a memory device, said system comprising:
    a disk having a plurality of tracks, wherein each of said plurality of tracks includes at least one sector;
    a memory device for storing sector identification data and user data;
    a drive data bus for transferring data between said storage disk and said memory; and
    a controller that manages read and write operations to and from said storage disk, wherein said controller further comprises means for selecting either said user data or said sector identification data to be transferred to said memory device, and wherein said controller further comprises a bus selector for switching said drive data bus between said user data and said sector identification data in response to a table update signal.

2. The system of claim 1, wherein said hard disk drive includes a read/write head for seeking a track in response to a read or write command from a drive controller, and wherein said drive controller further comprises means for selecting said sector identification data to be transferred to said memory device during said seeking.

3. The system of claim 2, wherein said sector identification data is stored in a sector identification table within said memory device, said system further comprising:
    an identification table controller comprising:
        means for generating drive track information, wherein said drive track information includes sector information for each track formed on said disk; and
        means for transferring said drive track information during said read/write head seeking a track.

4. The system of claim 3, wherein said sector identification table further comprises means for creating said sector identification table as a data structure within said memory device.

5. The system of claim 1, wherein each of said plurality of tracks includes:
    a servo sector containing data for providing radial orientation of said read/write head over said storage disk; and
    a data sector in which said user data is stored.

6. The system of claim 5, wherein said controller further comprises means for updating said track sector information for each track.

7. The system of claim 1, wherein said sector identification data includes physical sector information, bad sector information, and sector split information.

8. A method within a hard disk drive for transferring track sector information of a storage disk to a memory device, wherein said hard disk drive includes a disk having a plurality of tracks, wherein each of said plurality of tracks includes at least one sector, said method comprising:
    storing sector identification data and user data;
    transferring data between said storage disk and said memory; and controlling read and write operations to and from said storage disk, wherein either said user data or said sector identification data is selected to be transferred to said memory device in response to a table update signal.

9. The method of claim 8, wherein said hard disk drive includes a read/write head for seeking a track in response to a read or write command from a drive controller, and wherein said method further comprises selecting said sector identification data to be transferred to said memory device during said seeking.

10. The method of claim 9, wherein said sector identification data is stored in a sector identification table within said memory device, said method further comprising:

generating track information, wherein said track information includes sector information for each track formed on said disk; and transferring said track information during said read/write head seeking a track.

11. The method of claim 10, further comprising creating said sector identification table as a data structure within said memory device.

12. The method of claim 10, further comprising updating said track information for each track.

* * * * *